(12) United States Patent
Fan

(10) Patent No.: US 11,379,082 B2
(45) Date of Patent: Jul. 5, 2022

(54) ELECTRONIC DEVICE AND METHOD FOR DETECTING FINGERPRINTS

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bin Fan, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/996,662

(22) Filed: Aug. 18, 2020

(65) Prior Publication Data
US 2021/0132734 A1 May 6, 2021

(30) Foreign Application Priority Data
Oct. 31, 2019 (CN) .......................... 201911056341.X

(51) Int. Cl.
| | | |
|---|---|---|
| *G06F 3/042* | (2006.01) | |
| *G06F 3/041* | (2006.01) | |
| *G06F 21/32* | (2013.01) | |
| *H04L 67/06* | (2022.01) | |
| *H04W 12/06* | (2021.01) | |
| *G06V 40/12* | (2022.01) | |

(52) U.S. Cl.
CPC .......... *G06F 3/0421* (2013.01); *G06F 3/0414* (2013.01); *G06F 21/32* (2013.01); *G06V 40/1365* (2022.01); *H04L 67/06* (2013.01); *H04W 12/068* (2021.01)

(58) Field of Classification Search
CPC ...... G06F 3/0421; G06F 3/0414; G06F 21/32; G06F 21/31
See application file for complete search history.

(56) References Cited

U.S. PATENT DOCUMENTS

2019/0294770 A1* 9/2019 Han .................... G06F 21/36
2019/0340410 A1* 11/2019 Uchida ............... G06F 21/40
2019/0370526 A1* 12/2019 Wang .................. G01J 1/4204

* cited by examiner

*Primary Examiner* — Kevin M Nguyen
(74) *Attorney, Agent, or Firm* — ScienBiziP, P.C.

(57) ABSTRACT

A method for detecting fingerprints implemented in an electronic device includes detecting whether a display device is being pressed by at least one finger of a user according to signals of a pressure sensing device. If the display device is being pressed by the at least one finger of the user, controlling a fingerprint acquiring device to acquire fingerprint images of the at least one finger of the user and controlling a positioning device to acquire location information of the electronic device. The fingerprint images of the at least one finger of the user and the location information of the electronic device can be uploaded by the electronic device to a fingerprint database for fingerprint recognition.

9 Claims, 4 Drawing Sheets

ELECTRONIC DEVICE AND METHOD FOR DETECTING FINGERPRINTS

CROSS-REFERENCE TO RELATED APPLICATIONS

This application claims priority to Chinese Patent Application No. 201911056341.X filed on Oct. 31, 2019, the contents of which are incorporated by reference herein.

FIELD

The subject matter herein generally relates to fingerprint detection, and particularly to an electronic device and a method for detecting fingerprints therein.

BACKGROUND

Fingerprints are widely used to record or identify people. For example, smart electronic devices, such as smart phones and tablet computers, acquire and verify user's fingerprint information for unlocking or paying money. At least one finger's fingerprint information of the user is usually acquired from the designated area at a specific time (such as unlocking, login, payment, etc.), so that an illegal person who gets the smart electronic devices can easily prevent the smart electronic devices from acquiring his/her fingerprints, and avoid being found.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
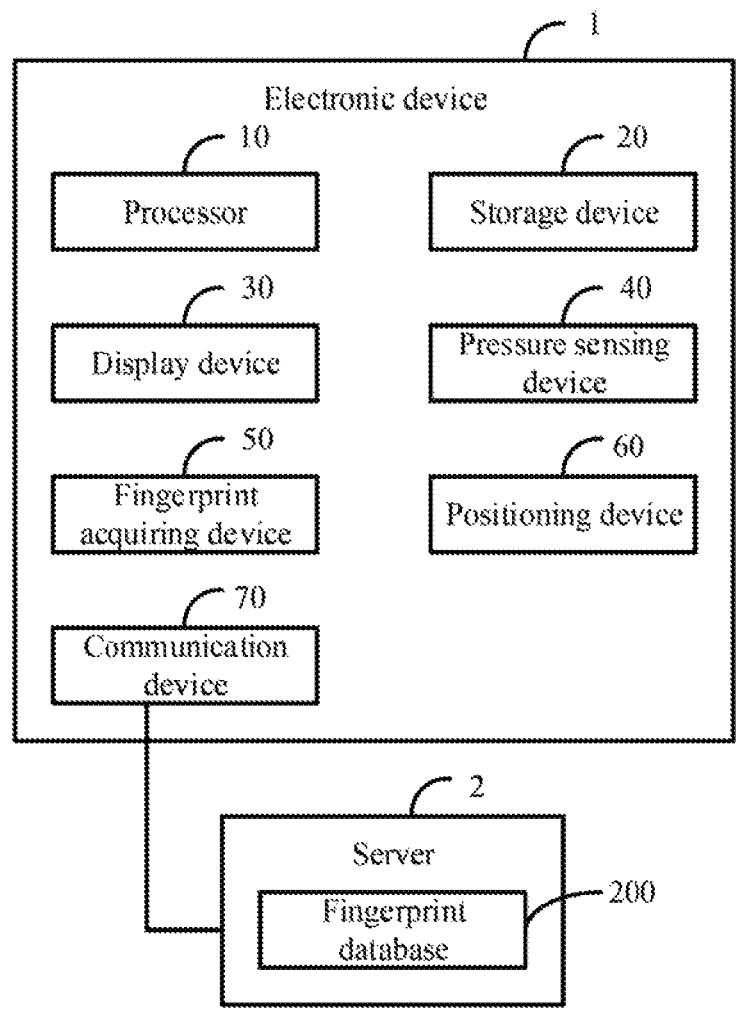
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

FIG. 1 illustrates an electronic device 1 in one embodiment. The electronic device 1 can be a smart phone, a tablet computer, or a smart watch. The electronic device 1 can detect fingerprints of a person where fingers are touching any area of a display device in real-time, and transmit the detected fingerprint information to a fingerprint database of a server, so as to determine whether the person currently using the electronic device 1 is legal or illegal.

The electronic device 1 includes, but is not limited to, a processor 10, a storage device 20, a display device 30, a pressure sensing device 40, a fingerprint acquiring device 50, a positioning device 60, and a communication device 70. FIG. 1 illustrates only one example of the electronic device 1. Other examples can include more or fewer components than as illustrated or have a different configuration of the various components.

The processor 10 can be a central processing unit (CPU), a microprocessor, or other data processor chip that performs functions in the electronic device 1.

In at least one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

In at least one embodiment, the display device 30 can be a touch screen. The display device 30 displays an operation interface of the electronic device 1.

In at least one embodiment, the pressure sensing device 40 can be a pressure sensor. The pressure sensing device 40 is coupled to the display device 30, and detects pressure on the display device 30.

Figure 2:
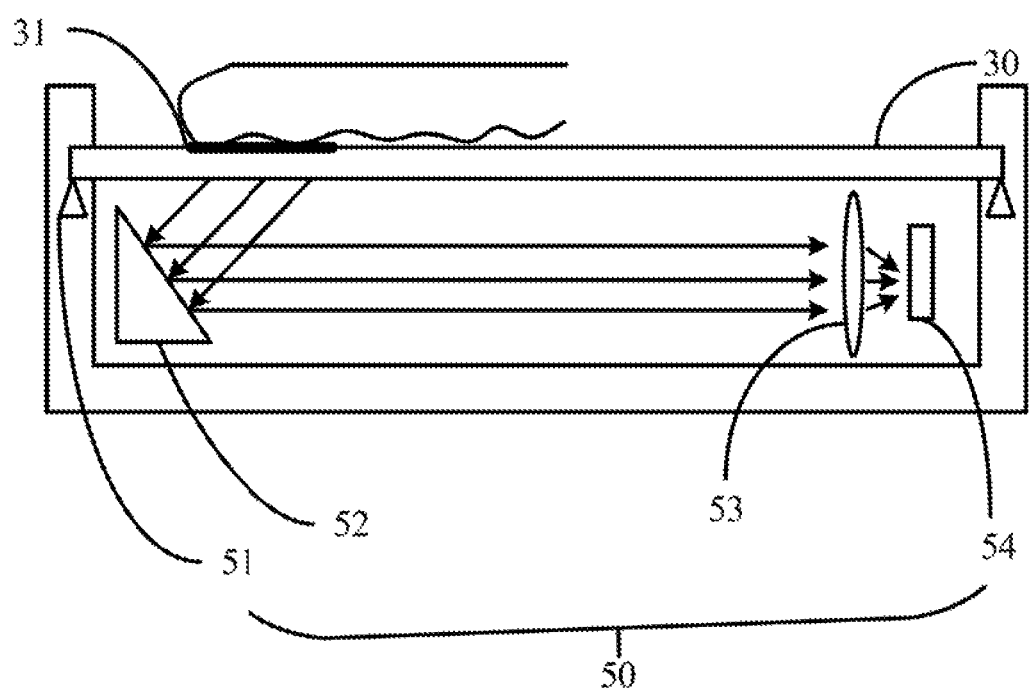
FIG. 2 is a schematic view of an embodiment of a fingerprint acquiring device of the electronic device.

Referring to FIG. 2, in at least one embodiment, the fingerprint acquiring device 50 is arranged in the electronic device 1, and located under the display device 30. The fingerprint acquiring device 50 includes, but is not limited to, at least one light source 51, a refraction unit 52, a focusing unit 53, and an image processing unit 54.

In at least one embodiment, the fingerprint acquiring device 50 includes two light sources 51. The two light sources 51 are arranged under ends of the display device 30. The two light sources 51 can be a red light source or blue light source. The refraction unit 52 can be a prism. The refraction unit 52 is arranged close to an end of the display device 30, and refracts light from the light source 51. The focusing unit 53 can be a convex lens. The focusing unit 53 is arranged on another end of the display device 30, and focuses the refracted light. The image processing unit 54 can be a CCD (Charge-Coupled Device) sensor. The image processing unit 54 is arranged on a side of the focusing unit 53 and far away from the refraction unit 52, and converts light signals to electric signals.

In at least one embodiment, the positioning device 60 can be a GPS (Global Positioning System) module. The positioning device 60 acquires position information of the electronic device 1.

In at least one embodiment, the communication device 70 can be a wireless communication module. The communication device 70 communicates with a server 2 through a wireless network, such WI-FI or cellular network.

Figure 3:
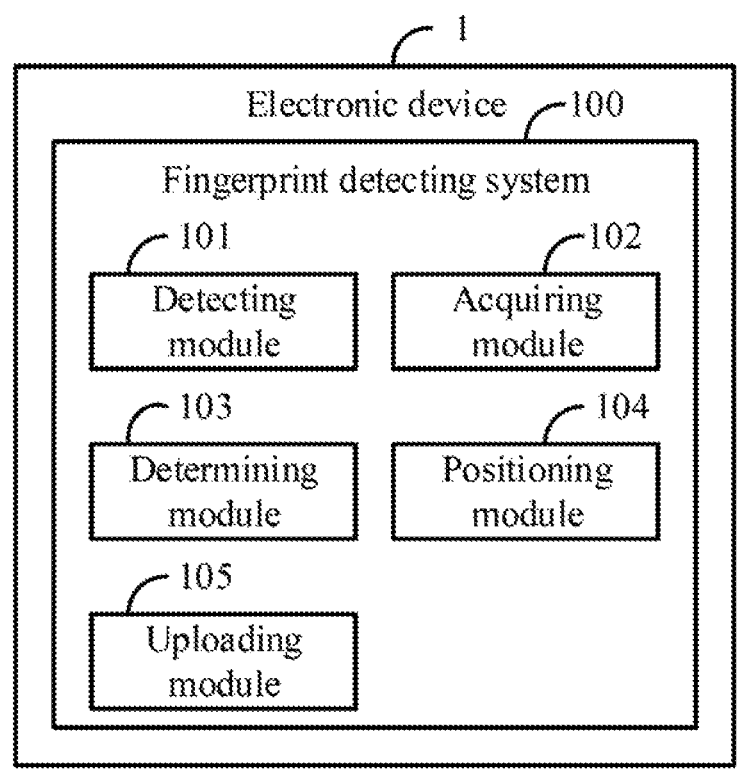
FIG. 3 is a block diagram of an embodiment of modules of the electronic device of FIG. 1.

As illustrated in FIG. 3, the electronic device 1 runs a fingerprint detecting system 100. The fingerprint detecting system 100 at least includes a detecting module 101, an acquiring module 102, a determining module 103, a positioning module 104, and an uploading module 105. The modules 101-105 can be collections of software instructions stored in the storage device 20 of the electronic device 1 and executed by the processor 10. The modules 101-105 also can include functionality represented as hardware or integrated circuits, or as software and hardware combinations, such as a special-purpose processor or a general-purpose processor with special-purpose firmware.

A function of uploading user fingerprint information is automatic and not user-activated or user-closable. In at least one embodiment, in order to ensure the security of user's personal information, the function of uploading the user fingerprint information may be remotely activated by a communications operator or manufacturer of the electronic device 1 according to requirements. For example, the communications operator or manufacturer may determine a phone number of an electronic device 1 which may be in possession of an illegal person or a person declared missing, and remotely control the electronic device 1 to activate the function of uploading user fingerprint information according to the phone number. In other embodiments, the function of uploading user fingerprint information may also be activated by default.

The detecting module 101 is used to detect whether the display device 30 is being pressed by at least one finger of the user according to signals of the pressure sensing device 40.

In at least one embodiment, when the function of uploading user fingerprint information of the electronic device 1 is activated, the detecting module 101 detects whether any area of the display device 30 is being pressed, by the at least one finger of the user according to the signals of the pressure sensing device 40 at predetermined time intervals. In at least one embodiment, the predetermined time can be five seconds.

In detail, when receiving the signals of the pressure sensing device 40, the detecting module 101 determines whether an operation that causes the pressure sensing device 40 to generate signals is a touch operation. When the operation that causes the pressure sensing device 40 to generate signals is a touch operation, the detecting module 101 determines that the display device 30 is being pressed by the at least one finger of the user. When the signals of the pressure sensing device 40 are not received or when the operation that causes the pressure sensing device 40 to generate signals is not a touch operation, the detecting module 101 determines that the display device 30 is not pressed by the at least one finger of the user.

The acquiring module 102 is used to control the fingerprint acquiring device 50 to acquire fingerprint images of the at least one finger of the user, when the detecting module 101 detects that the display device 30 is being pressed by the at least one finger of the user.

In detail, when the detecting module 101 detects that the display device 30 is being pressed by the at least one finger of the user, the acquiring module 102 controls the fingerprint acquiring device 50 to emit a light beam to the display device 30. In at least one embodiment, the light source 51 of the fingerprint acquiring device 50 emits a red light beam to the display device 30.

In other embodiments, the determining module 103 is used to control the pressure sensing device 40 to determine the area of the display device 30 which is being pressed by the at least one finger of the user, when the detecting module 101 detects that the display device 30 is being pressed by the at least one finger of the user.

In some embodiments, the pressure sensing device 40 can be a piezoresistive pressure sensor, the components of the pressure sensing device 40 are laid on the display device 30, and a slight deformation will occur when the display device 30 is being pressed. The pressure sensing device 40 determines the areas of the display device 30 where the slight deformation occurs to be the area that is being pressed by the at least one finger of the user.

In some embodiments, the areas of the display device 30 which are being pressed may be represented by a coordinate range. The acquiring module 102 controls the fingerprint acquiring device 50 to emit a light beam to the area which is being pressed. The acquiring module 102 further acquires the coordinate range of the area of the display device 30 which is being pressed, and controls a direction of the light beam emitted by the light source 51 according to the coordinate range, so as to emit the light beam to the areas of the display device 30 which are being pressed.

The acquiring module 102 further controls the fingerprint acquiring device 50 to receive the light reflected by the at least one finger which carries the fingerprint information of the at least one finger.

As illustrated in FIG. 2, in at least one embodiment, when the light beam emitted by the light source 51 irradiates at least one finger of the user, due to presence of fingerprints, a skin surface of the at least one finger is uneven, so that angles and brightness of the reflected light which are reflected by the uneven lines on the fingerprint of the at least one finger of the user are different, the reflected light can thus carry the fingerprint information of the at least one finger of the user. The refraction unit 52 of the fingerprint acquiring device 50 can receive the light reflected by the at least one finger.

The acquiring module 102 further controls the fingerprint acquiring device 50 to generate at least one fingerprint image of the at least one finger of the user, according to the received light reflected by the at least one finger of the user.

In at least one embodiment, the refraction unit 52 projects the received light reflected by at least one finger of the user to the image processing unit 54 via the focusing unit 53, and then forms a digital fingerprint image by a photoelectric conversion. In at least one embodiment, convex lines (the lines with a certain width and direction in the fingerprint image) in the fingerprint image are black, and concave lines (the concave parts between the lines) are white, the convex lines and the concave lines can thus carry the fingerprint distribution of the at least one finger of the user.

In other embodiments, the display device 30 includes a fingerprint acquiring area 31, and the pressure sensing device 40 and the fingerprint acquiring device 50 are arranged under the fingerprint acquiring area 31. The detecting module 101 detects whether the fingerprint acquiring area 31 is being pressed by the at least one finger of the user according to the signals of the pressure sensing device 40. The acquiring module 102 controls the fingerprint acquiring device 50 to acquire the fingerprint image of the at least one finger of the user, when the detecting module 101 detects that the fingerprint acquiring area 31 is being pressed by the at least one finger of the user.

The positioning module 104 is used to control the positioning device 60 to acquire location information of the electronic device 1.

In at least one embodiment, the location information can be latitude and longitude information. In other embodiments, the information can also be coordinate information.

The uploading module 105 is used to upload the fingerprint image of the at least one finger of the user and the location information of the electronic device 1 to a fingerprint database 200, the server 2 compares the fingerprint image with fingerprint images stored in the fingerprint database 200, and determines whether the user is legal or otherwise.

In at least one embodiment, the server 2 includes the fingerprint database 200. The uploading module 105 uploads the fingerprint image generated by the image processing unit 54 and the positioning information of the electronic device 1 to the fingerprint database 200 through the communication device 70.

In at least one embodiment, the server 2 belongs to a public security system, and the fingerprint database 200 includes fingerprint image information of citizens of a country. When it is necessary to determine whether the user is legal, the public security system can screen and compare the fingerprint image of the at least one finger with all the fingerprint image information in the fingerprint database 200. When the fingerprint image matches one of the fingerprints image information, the public security system can determine the user to be illegal or illegal, and identity information of the user can be acquired.

In at least one embodiment, the uploading module 105 uploads the location information of the electronic device 1 to the server 2, to facilitate relevant departments to determine the location of the user.

Figure 4:
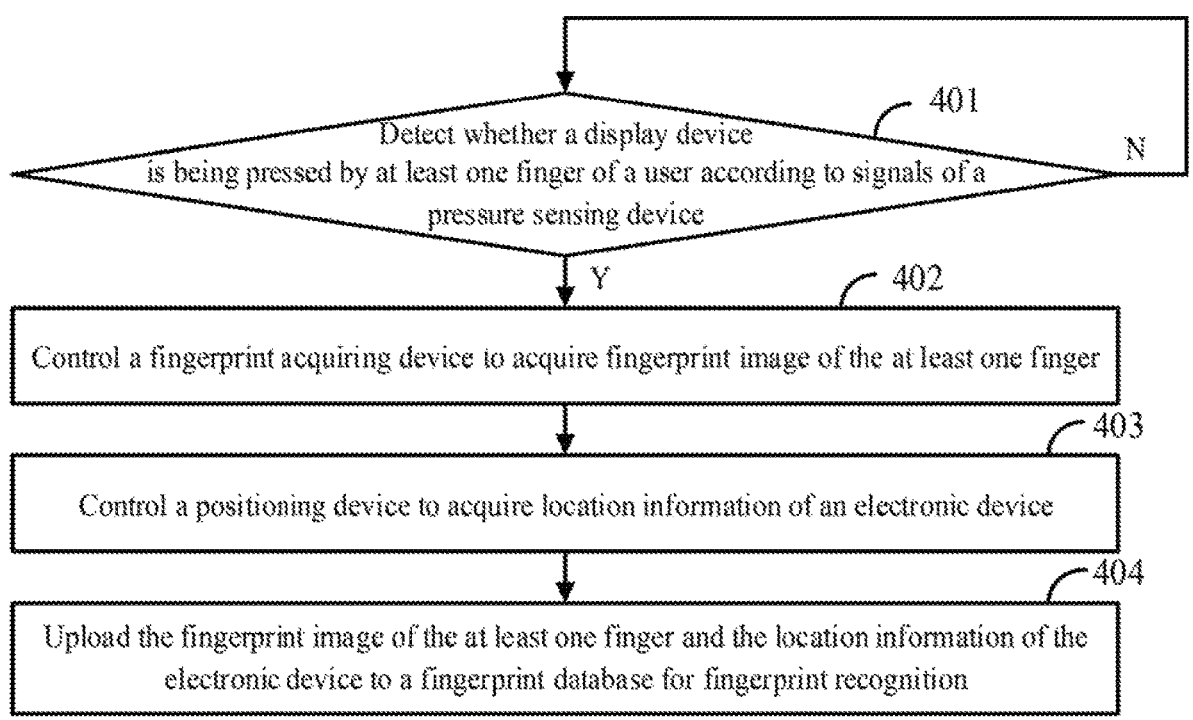
FIG. 4 illustrates a flowchart of an embodiment of a method for detecting fingerprints.

FIG. 4 illustrates a flowchart of an embodiment of a method for detecting fingerprints. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the detecting module 101 detects whether the display device 30 is being pressed by at least one finger of the user according to signals of the pressure sensing device 40.

At block 402, the acquiring module 102 controls the fingerprint acquiring device 50 to acquire fingerprint images of the at least one finger of the user.

In at least one embodiment, the acquiring module 102 controls the fingerprint acquiring device 50 to emit a light beam to the display device 30, receive the light reflected by the at least one finger which carries the fingerprint information of the at least one finger, and generate at least one fingerprint image of the at least one finger of the user according to the received light reflected by the at least one finger of the user.

In other embodiments, the determining module 103 controls the pressure sensing device 40 to determine the area of the display device 30 which is being pressed by the at least one finger of the user, the acquiring module 102 controls the fingerprint acquiring device 50 to emit a light beam to the area which is being pressed.

At block 403, the positioning module 104 controls the positioning device 60 to acquire location information of the electronic device 1.

At block 404, the uploading module 105 uploads the fingerprint image of the at least one finger of the user and the positioning information of the electronic device 1 to a fingerprint database 200 for fingerprint recognition.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
detect whether a display device is being pressed by at least one finger of a user according to signals of a pressure sensing device;
determine, in response that the display device is being pressed by the at least one finger of the user, an area which is being pressed by the at least one finger of the user of the display device by acquiring a coordinate range of the area of the display device which is being pressed;
control a fingerprint acquiring device to emit a light beam to the area which is being pressed by the at least one finger of the user according to the coordinate range;
control the fingerprint acquiring device to acquire fingerprint images of the at least one finger of the user;
control a positioning device to acquire location information of the electronic device; and
upload the fingerprint images of the at least one finger of the user and the location information of the electronic device to a fingerprint database for fingerprint recognition.

2. The electronic device according to claim 1, wherein the at least one processor is further caused to:
receive light reflected by the at least one finger which carries the fingerprint information of the at least one finger; and
generate the at least one fingerprint images of the at least one finger of the user according to the received light reflected by the at least one finger of the user.

3. The electronic device according to claim 2, wherein the fingerprint acquiring device comprises at least one light source, a refraction unit, a focusing unit, and an image processing unit, the at least one light source emits a red light beam to the display device, the refraction unit receives the light reflected by the at least one finger, the focusing unit focuses the light reflected by the at least one finger, the image processing unit generates the at least one fingerprint images of the at least one finger of the user according to the received light reflected by the at least one finger of the user and carrying the user fingerprint information of the at least one finger.

4. The electronic device according to claim 1, wherein the display device comprises a fingerprint acquiring area; wherein the at least one processor is further caused to:
   detect whether the fingerprint acquiring area is being pressed by the at least one finger of the user according to the signals of the pressure sensing device; and
   control, in response that the fingerprint acquiring area is being pressed by the at least one finger of the user, the fingerprint acquiring device to acquire the fingerprint images of the at least one finger of the user.

5. The electronic device according to claim 1, wherein the at least one processor is further caused to:
   control a communication device to communicate with a server through WI-FI or cellular network; and
   upload the fingerprint images of the at least one finger of the user and the location information of the electronic device to the fingerprint database of the server through the communication device for fingerprint recognition.

6. A method for detecting fingerprints implemented in an electronic device comprising:
   detecting whether a display device is being pressed by at least one finger of a user according to signals of a pressure sensing device;
   determining, in response that the display device is being pressed by the at least one finger of the user, an area which is being pressed by the at least one finger of the user of the display device;
   acquiring a coordinate range of the area of the display device which is being pressed;
   controlling a fingerprint acquiring device to emit a light beam to the area which is being pressed by the at least one finger of the user according to the coordinate range;
   controlling the fingerprint acquiring device to acquire fingerprint images of the at least one finger of the user;
   controlling a positioning device to acquire location information of the electronic device; and
   uploading the fingerprint images of the at least one finger of the user and the location information of the electronic device to a fingerprint database for fingerprint recognition.

7. The method according to claim 6, wherein a method of controlling a fingerprint acquiring device to acquire fingerprint images of the at least one finger of the user comprises:
   receiving light reflected by the at least one finger which carries the fingerprint information of the at least one finger; and
   generating the at least one fingerprint images of the at least one finger of the user according to the received light reflected by the at least one finger of the user.

8. The method according to claim 6, methods of detecting whether a display device is being pressed by at least one finger of a user according to signals of a pressure sensing device and controlling a fingerprint acquiring device to acquire fingerprint images of the at least one finger of the user comprise:
   detecting whether a fingerprint acquiring area is being pressed by the at least one finger of the user according to the signals of the pressure sensing device; and
   controlling, in response that the fingerprint acquiring area is being pressed by the at least one finger of the user, the fingerprint acquiring device to acquire the fingerprint images of the at least one finger of the user.

9. The method according to claim 6, wherein a method of uploading the fingerprint images of the at least one finger of the user and the location information of the electronic device to a fingerprint database for fingerprint recognition comprises:
   controlling a communication device to communicate with a server through WI-FI or cellular network; and
   uploading the fingerprint images of the at least one finger of the user and the location information of the electronic device to the fingerprint database of the server through the communication device for fingerprint recognition.

* * * * *